Sept. 23, 1958 R. W. QUIRK 2,853,574

MAGNETIC TAPE POSITION INDICATING DEVICE

Filed Jan. 18, 1956 2 Sheets-Sheet 1

ROBERT W. QUIRK,
INVENTOR
BY Henry Heyman
ATTORNEY

Sept. 23, 1958 R. W. QUIRK 2,853,574

MAGNETIC TAPE POSITION INDICATING DEVICE

Filed Jan. 18, 1956 2 Sheets-Sheet 2

ROBERT W. QUIRK,
INVENTOR

BY Henry Heyman
ATTORNEY

United States Patent Office 2,853,574

Patented Sept. 23, 1958

2,853,574

MAGNETIC TAPE POSITION INDICATING DEVICE

Robert W. Quirk, Los Angeles, Calif., assignor to Hughes Aircraft Company, Culver City, Calif., a corporation of Delaware Application January 18, 1956, Serial No. 559,927

10 Claims. (Cl. 200—81)

The present invention relates to magnetic tapes, and more particularly to a device suitable to be positioned adjacent to a rapidly moving magnetic tape for detecting and indicating the arrival of a reference point on the tape.

It is now well known in the art to use a long flexible medium in the form of a tape, coated with a suitable magnetizable material, for the recording and reproducing of intelligence. The magnetic tape moves longitudinally past a transducer which is operable to record information on the tape or to read information therefrom. One of the problems which arises in this type of application is that of keeping track of the position of the tape. For example, if a large quantity of tape is wound on a reel, it may be desired to automatically stop the tape when the end of the reel is reached, rewind the reel, and then proceed with some other operation. For this and similar purposes it therefore is necessary to provide in the recording and reproducing system a means for automatically detecting and indicating when the tape has arrived at some predetermined position or reference point.

One solution to the above problem is to place a perforation or hole in the tape at a desired reference point. One type of device for detecting the arrival of such a perforated portion of the tape at a predetermined fixed point is described in U. S. Patent 2,574,688, entitled, "Switch for Use with a Perforated Tape," issued November 13, 1951 to Marvin Camras. Camras discloses a device in which tongue is continuously urged against the tape, and the arrival of the perforation in the tape is detected by virtue of the fact that the tongue then projects through the perforation of the tape.

Devices of the general type shown by Camras are subject to a number of serious disadvantages. Besides being very complex, they impose considerable wear upon the tape because of the continuous pressure contact which is employed. Further, these devices generally have a slow response time which is unsatisfactory where tape speeds of the order of 100 inches per second are involved. The problem of wear on the tape becomes very important, for example, in large electronic computer systems wherein large quantities of tape are operated continuously at very high speeds. In such systems, noticeable amounts of tape wear require frequent replacements, involving equipment shutdowns and considerable expense in installing the new tape and readjusting the equipment.

In general, prior art devices for indicating a predetermined reference point on a moving magnetic tape have been unsatisfactory because of large size, unreliability, and short useful life.

It is, therefore, an object of the present invention to provide a magnetic tape position indicating device which is small, cheap, and reliable.

A further object of the invention is to provide a device for use in conjunction with a moving magnetic tape having a perforation therein, for automatically indicating the arrival of the perforation at a predetermined fixed point.

According to the present invention a vacuum-operated mechanical switch responds to the presence of the hole or perforation in the moving magnetic tape for closing an electrical circuit thus indicating the arrival of the perforation at the fixed location of the indicating device.

More particularly, the indicating device of the present invention includes a vacuum chamber situated on one side of the moving tape, the vacuum chamber having a perforated surface substantially in contact with the moving tape for communicating a partial vacuum thereto; a leaf spring which is movably mounted on the opposite side of the moving tape, in spaced parallel relation thereto, and responsive to a partial vacuum communicated through the hole in the tape to move toward the tape; and means connected to the leaf spring for closing a pair of electrical contacts when the leaf spring moves toward the tape in response to the partial vacuum.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Reference is now made to the drawings, in which like numerals designate like parts throughout, and more particularly to Figs. 1–2 thereof.

Figure 1:
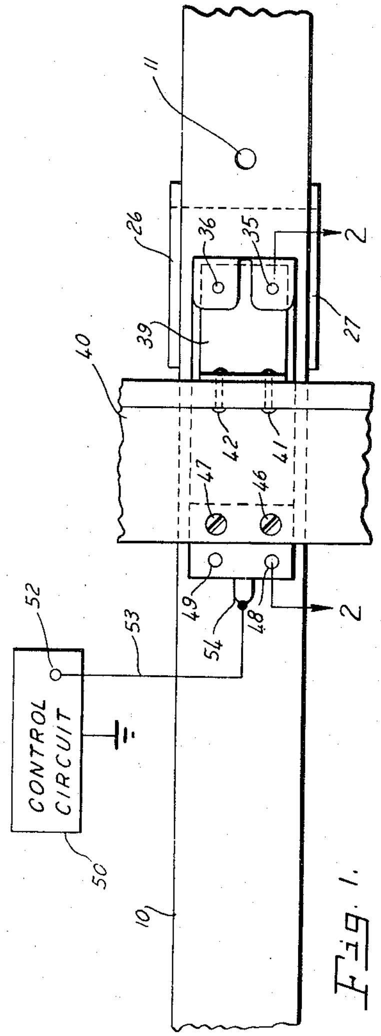
Fig. 1 is a plan view of the position indicating device of the present invention showing a portion of magnetic tape moving therethrough.
Figure 2:
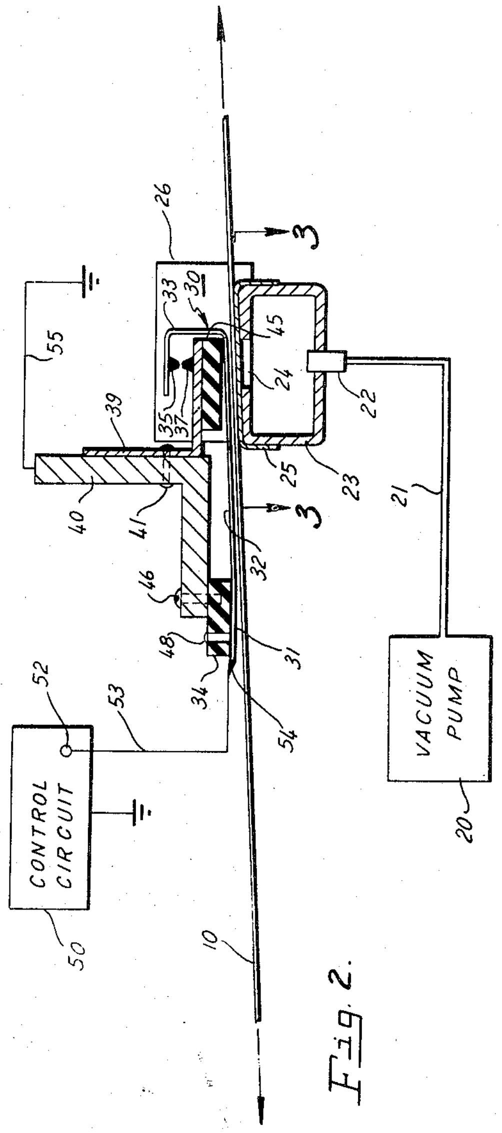
Fig. 2 is a vertical section taken along line 2—2 of Fig. 1 and shows an elevation view of the position indicating device and of the magnetic tape passing therethrough.

A tape 10 indicated by arrows in Fig. 2 as being longitudinally movable in either direction has a hole 11 therein. A vacuum pump 20 supplies a partial vacuum via a line 21 and a coupling 22 to a vacuum chamber 23 having an opening 24 in the top plate or lid thereof. A perforated plate or screen 25 covers the top plate of chamber 23. A rear shield 26 and a front shield 27 positioned on either side of the chamber provide means for guiding the tape so that it rides smoothly across the perforated plate 25.

Figure 3:
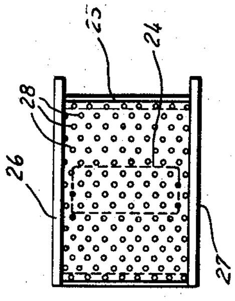
Fig. 3 is a plan view illustrating in greater detail the vacuum chamber of the position indicating device.

The partial vacuum may, for example, correspond to a vertical column of 12 inches of mercury. The magnetic tape may be Mylar base magnet tape having a width of one inch and a thickness of 1.7 mils. The hole 11 may have a diameter of ¼ inch. Opening 24 may extend approximately 5/16 inch in the longitudinal direction of the tape, and plate 25 may include a number of perforations 28 (see Fig. 3), each having a diameter of approximately 10 mils.

A leaf spring 30 having a base portion 31 which is fixedly positioned with respect to chamber 23, a control portion 32 which is normally positioned substantially in parallel to tape 10, and an upwardly bent end portion 33, provides the mechanical switching action. Base portion 31 is rigidly mounted upon a first fixed block 34 made of insulating material. End portion 33 is arranged in a substantially semicircular or hook configuration, doubling back over the top of control portion 32. On the under surface of the upper extremity of end portion 33 are mounted first electrical contacts 35, 36 facing toward the tape. Although it is preferred to use two separate contacts as illustrated, a single contact may of course be used. A first support bar 39 which is fixedly positioned above vacuum chamber 23 extends between control portion 32 and end portion 33, and has second electrical contacts 37, 38 mounted on the upper surface thereof and facing toward first contacts 35, 36.

In the illustrated embodiment of the invention leaf spring 30 is approximately ⅞ inch in width, being centrally disposed with respect to the magnetic tape 10. Leaf spring 30 may, for example, be comprised of phosphor bronze, or spring brass having a thickness of 4 mils. Base portion 31, control portion 32, and end portion 33 are preferably fashioned integrally from a single piece of spring material. In its normal position, control portion 32 may be separated from tape 10 by approximately 10 mils, for example. When perforation or hole 11 arrives opposite opening 24, however, the partial vacuum communicated therethrough is operable to draw control portion 32 substantially into contact with moving tape 10.

The mechanical support structure includes a second support bar 40 which, with chamber 23, is rigidly supported by means of a frame, not shown. Rivets 41, 42 fasten first support bar 39 to second support bar 40. A second block 45 of insulating material is fastened, for example, by cementing to the under portion of support bar 39, so that leaf spring 30 in its normal position pushes upward against the under surface of block 45. First block 34 is rigidly fastened to second support bar 40 by means of screws 46, 47. Leaf spring 30 is in turn rigidly fastened to first block 34 by means of rivets 48, 49.

The electrical circuit includes a control circuit 50 which is connected to ground, and also via a lead 53 to a tab 54 on leaf spring 30. Leaf spring 30 is of suitable conducting material, hence the circuit is completed by spring 30, first contacts 35, 36, second contacts 37, 38, first support bar 39, second support bar 40, a lead 55 to ground. It is important in this connection to note that first support bar 39 and second support bar 40 are comprised of conducting material, whereas first block 34 and second block 45 are insulators. It will also be noted that screws 46, 47 do not penetrate all the way through first block 34, and that rivets 48, 49 do not make contact with support bar 40. When leaf spring 30 is urged into contact with magnetic tape 10, electrical current flows along the path previously traced inasmuch as tape 10 is of a non-conductive type material.

Figure 4E:
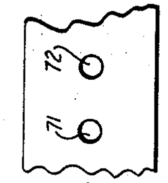
Figs. 4*a* to 4*e*, inclusive, illustrate various configurations of perforations or holes in the tape.
Figure 4D:
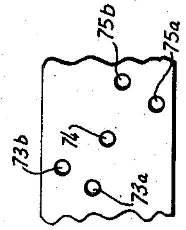
Figure 4C:
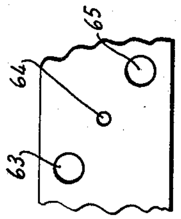
Figure 4B:
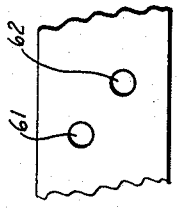
Figure 4A:
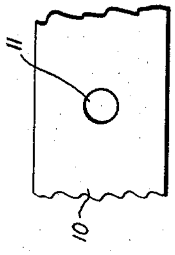

Fig. 4*a* shows a single hole 11 in the tape, which may in general be used for any position referencing purpose. Where it is desired to automatically stop the tape, however, suitable modifications of control circuit 50 may be utilized in conjunction with other hole configurations such as are shown in Figs. 4*b*–4*e*.

In order to stop the tape it is necessary to have one hole to actuate the braking action. Further, when the tape has actually stopped, it is desirable to be able to interrogate the tape mechanism to ascertain whether the tape has stopped at a correct stopping point. For this purpose a second hole or perforation may be used, separated from the first hole by the normal stopping distance of the tape. Thus, if the tape is stopped and the electrical circuit is closed, a correct stopping point was reached. Also, the closing of the electrical circuit upon arrival of the second hole may be utilized to keep the brake on and hence retain the tape in a stopped condition.

Referring to Fig. 4*b*, holes 61 and 62 in the tape are separated along the tape length by a distance equal to the normal stopping distance. If the tape is moving toward the left, stopping action is initiated on hole 61 and the tape comes to rest with hole 62 in position to communicate the partial vacuum to leaf spring 30; if the tape is moving to the right, stopping is initiated by hole 62 and the tape is held in the stopped position by hole 61.

A similar arrangement is provided in Fig. 4*e* by holes 71 and 72. Whereas holes 61 and 62 of Fig. 4*b* are staggered across the tape width, holes 71 and 72 are both in the center of the tape.

When the tape is stopped, a smaller hole is required to operate the switch than when the tape is moving. Thus in Fig. 4*c* a large hole 63 initiates stopping when tape motion is leftward, a large hole 65 initiates stopping when tape motion is rightward, and a small hole 64 located between holes 63 and 65 holds the tape in stopped position. A similar arrangement is shown in Fig. 4*d* where a pair of small holes 73*a*, 73*b* provide the equivalent of large hole 63; small hole 74 is the counterpart of hole 64; and small holes 75*a*, 75*b* are the equivalent of large hole 65.

The advantage of using two or more holes, instead of a long slot or groove in the tape, is that leakage from the vacuum system is substantially eliminated.

What is claimed as new is:

1. In a magnetic information recording and reading system including a longitudinally moving magnetic tape having a hole therein for indicating the relative position thereof, a device operable during movement of the tape for detecting the arrival of the hole at a predetermined location, said device comprising: vacuum generator means including a perforated surface fixedly positioned adjacent the tape for communicating a partial vacuum to one surface thereof; a leaf spring mounted on the opposite side of the tape, said leaf spring including a base portion fixedly positioned with respect to the tape, a flat control portion normally positioned in close parallel relation to the tape opposite said vacuum generator means, and an end portion comprising a substantially semicircular loop fashioned integral with said control portion, said end portion having a first electrical contact button on the extremity thereof and facing toward said flat control portion; an insulating block fixedly positioned with respect to the tape in substantially parallel relation thereto on the side of said flat control portion opposite the tape, said insulating block having a second electrical contact button mounted thereon facing said first button, said first and second buttons being normally out of contact with each other; and an electrical circuit connected to said first and second buttons, whereby during movement of the tape when the hole arrives between said perforated surface and said flat control portion of said leaf spring, said partial vacuum is communicated to said flat control portion, drawing said flat control portion toward the tape, thereby urging said first contact against said second contact and closing said electrical circuit to indicate the arrival of the hole at the predetermined location.

2. A position indicating device for detecting and indicating a predetermined position of a rapidly moving record tape, the tape having a hole of substantial size therein for detecting the position thereof, said device comprising: a first member having a first flat surface and a plurality of perforations therein; first means for continuously communicating a partial vacuum to said surface via said perforations; a second member having a second flat surface; spring means connected to said second member for normally positioning said second flat surface in close parallel relation to said first flat surface, thus providing an aperture for moving the record tape therethrough, said spring means permitting said second flat surface to be moved toward said first flat surface upon the occurrence of low pressure between said second flat surface and said tape; and second means, including an electrical switch, connected to said second member and operable for actuating said switch when said second member is substantially displaced toward said first flat surface.

3. The device claimed in claim 2 wherein said second means includes a first electrical contact fixedly positioned adjacent said second member on the side opposite said second flat surface, and a second electrical contact fixed to said second member and normally positioned a predetermined distance from said first contact in a direction away from said second member, whereby the motion of said second member toward said first flat surface urges said second contact against said first contact.

4. In a magnetic information recording and reading system, a device for indicating the relative position of a longitudinally moving magnetic tape, the tape having a hole therein for determining the position thereof, said device comprising: first means fixedly positioned adjacent the moving tape for communicating a partial vacuum to one surface thereof; a spring loaded flat switch arm having a flat face normally positioned adjacent the other surface of the tape opposite said first means and biased away from said tape, and movable towards the tape, whereby when the hole in the tape arrives between said first means and said flat switch arm, said flat switch arm is actuated toward the tape in response to the partial vacuum communicated through the hole; and second means associated with said flat switch arm and including a pair of electrical contacts for closing said contacts in response to the movement of said flat switch arm.

5. The device claimed in claim 4 wherein one of said contacts is fixedly positioned adjacent said switch arm on the side thereof opposite the moving tape, and the other one of said contacts is connected to said flat switch arm in substantially rigid relation, and is normally positioned a predetermined distance from said first contact in a direction away from said flat switch arm whereby the motion of said flat switch arm toward the tape urges said other contact against said one contact.

6. In a magnetic information recording and reading system including a longitudinally moving magnetic tape having a hole therein for indicating the relative position thereof, a device for detecting the arrival of the hole at a predetermined location, said device comprising: vacuum generator means for communicating a partial vacuum to one surface of the tape; a leaf spring mounted on the opposite side of the tape, said leaf spring including a base portion fixedly positioned with respect to the tape, a flat control portion having a face normally positioned in close parallel relation to the tape opposite said vacuum generator means, and an end portion comprising a substantially semicircular loop fashioned integral with said control portion, and electrical switch means coupled to said end portion and responsive to displacement of said flat control portion toward the tape for indicating the arrival of the hole at the predetermined location.

7. In a magnetic information recording and reading system including a longitudinally moving magnetic tape having a hole therein for indicating the relative position thereof, a device operable during movement of the tape for detecting the arrival of the hole at a predetermined location, said device comprising: means disposed in contiguous relationship to a first surface of the tape for producing a vacuum force against the surface, holding means disposed in contiguous relationship to a second face of the tape opposite to the first face, a leaf spring disposed in close but spaced relationship to the second face of the tape and attached at one end to the holding means and extending from the holding means to a position above the hole in the tape at the other end for a pivotal movement of the spring relative to the holding member into a position closing the hole upon a movement of the hole into coupled relationship with the vacuum means, a first contact supported by the holding means, and a second contact supported by the leaf spring at the pivotable end of the leaf spring and disposed in a first electrical relationship with the first contact during the disposition of the leaf spring in spaced relationship to the tape and movable with the leaf spring into a second electrical relationship opposite to the first relationship upon the movement of the hole into coupled relationship with the vacuum means.

8. In a magnetic information recording and reading system including a longitudinally moving magnetic tape having a hole therein for indicating the relative position thereof, a device operable during movement of the tape for detecting the arrival of the hole at a predetermined location, said device comprising: means disposed in contiguous relationship to a first surface of the tape for producing a vacuum force against the surface, electrically conductive support means disposed near a second surface of the tape opposite to the first surface, a first insulating member attached to the conductive support means and disposed between the support means and the tape, a leaf spring attached at one end to the first insulating member and disposed between the first insulating member and the tape in close but spaced relationship to the tape and in insulated relationship to the conductive support means and in pivotable relationship to the insulating member, the support means and the tape for a pivotal movement of the leaf spring toward the hole upon a movement of the hole into coupled relationship with the vacuum means, a second insulating member attached to the conductive support means and disposed between the support means and the leaf spring at the pivotable end of the tape to insulate the pivotable end of the leaf spring from the support means, a first electrical contact mounted on the support means in electrically conductive relationship to the support means, a second electrical contact mounted on the leaf spring and disposed in first electrical relationship with the first contact in the disposition of the leaf spring away from the hole and movable into an opposite electrical relationship upon a pivotal movement of the leaf spring toward the hole, and means for providing a continuous electrical circuit with the support means, the first and second contacts and the leaf spring in a particular one of the electrical relationships between the first and second contacts.

9. Apparatus as set forth in claim 8 in which the leaf spring and the conductive support means are provided with the same reference potential.

10. Apparatus as set forth in claim 9 in which the first contact is mounted on the conductive means to extend in a direction away from the tape and in which the leaf spring is provided at its pivotable end with a portion extending in a looped configuration away from the tape and in which the second contact is mounted on the looped portion of the leaf spring to extend toward the tape and toward the first contact and in which the first contact is movable into engaged relationship with the second contact upon a pivotal movement of the leaf spring toward the hole.

References Cited in the file of this patent

UNITED STATES PATENTS

| | | |
|---|---|---|
| 1,065,576 | Amet | June 24, 1913 |
| 1,322,506 | Austin | Nov. 25, 1919 |
| 1,588,831 | Yokoyama | June 15, 1926 |
| 1,619,103 | Doman | Mar. 1, 1927 |
| 1,628,723 | Hall | May 17, 1927 |
| 1,911,259 | Bergoin | May 30, 1933 |